United States Patent [19]

Scrivo

[11] Patent Number: 4,600,312
[45] Date of Patent: Jul. 15, 1986

[54] IMPINGEMENT MIX-HEAD FOR RIM PROCESS

[75] Inventor: Jerry V. Scrivo, Holland, Mich.

[73] Assignee: Ex-Cell-O Corporation, Troy, Mich.

[21] Appl. No.: 709,868

[22] Filed: Mar. 8, 1985

[51] Int. Cl.⁴ .................... B01F 15/02; B01J 19/00
[52] U.S. Cl. .................... 366/159; 137/625.4;
366/177; 366/189; 422/133
[58] Field of Search .......... 366/134, 137, 159, 189, 366/269, 177; 422/133; 137/625.4; 425/130, 200; 264/DIG. 83

[56] References Cited

U.S. PATENT DOCUMENTS

| | | | |
|---|---|---|---|
| 2,171,095 | 8/1939 | Orsini | 425/130 X |
| 3,706,515 | 12/1972 | Keverleber et al. | 425/4 R |
| 4,053,283 | 10/1977 | Schneider et al. | 366/179 X |
| 4,099,919 | 7/1978 | Leidal | 422/133 |
| 4,175,874 | 11/1979 | Schneider | 366/182 |
| 4,226,543 | 10/1980 | Schluter | 366/159 |

Primary Examiner—Philip R. Coe
Attorney, Agent, or Firm—John C. Evans

[57] ABSTRACT

A high pressure mix-head for use in reaction injection molding systems includes a full cross section control piston and body slots and primary pour orifices for establishing pressure balance during recirculation and pour cycles.

5 Claims, 6 Drawing Figures

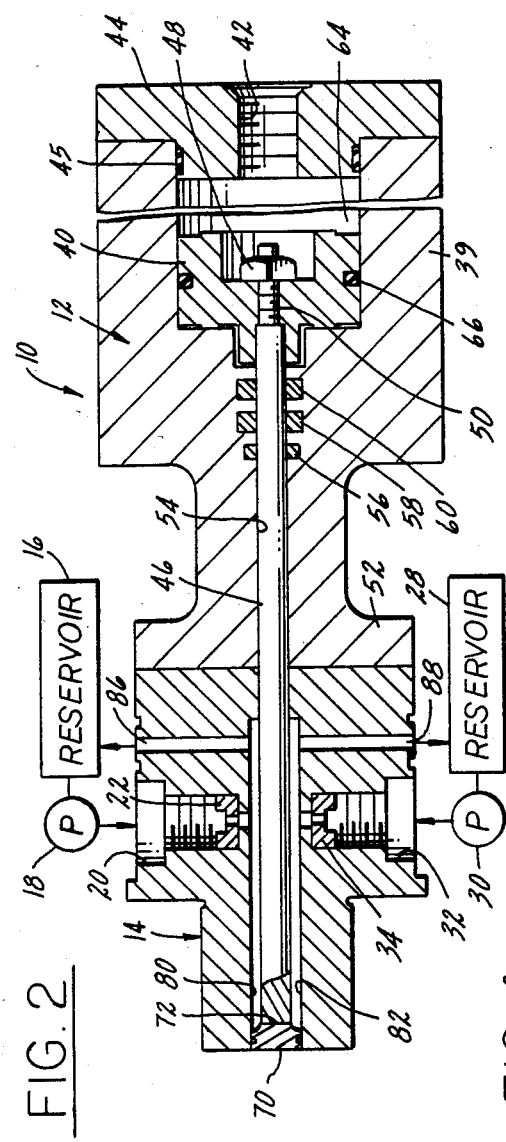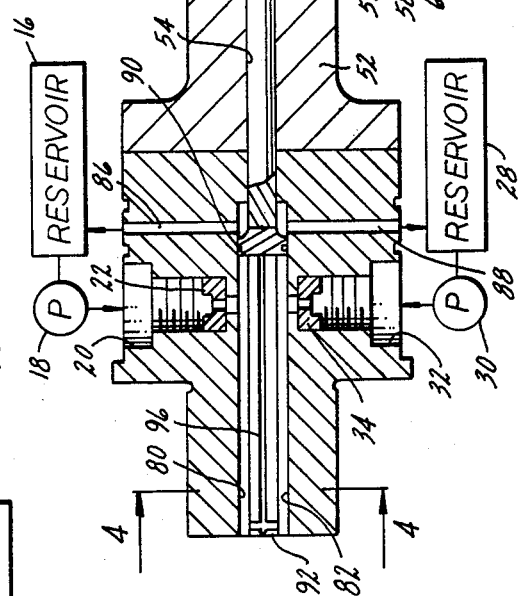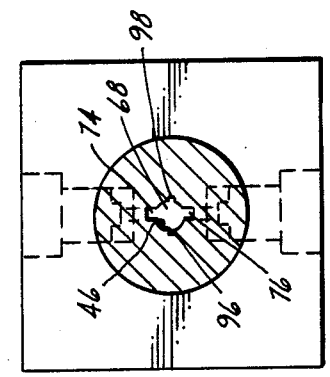

IMPINGEMENT MIX-HEAD FOR RIM PROCESS

BACKGROUND OF THE INVENTION

This invention relates to mix-heads for two chemically reactive streams and more particularly to such mix-heads for impingement mixing and stream transfer of two or more chemically reactive plastic compositions and wherein the mix-head includes recirculation passages.

Various high pressure mix-heads have been proposed that provide combined recirculation flow and impingement mixing injection and flow from the mix-head to a mold cavity. U.S. Pat. No. 4,175,874 issued Nov. 27, 1979 and U.S. Pat. No. 4,053,283 issued Oct. 11, 1977 disclose such a mix-head wherein the recirculation passages are formed in the piston. U.S. Pat. No. 3,706,515 issued Dec. 19, 1972 utilizes a constant section plunger. However, a separate movable slide plunger is required to provide recirculation paths.

SUMMARY OF THE INVENTION

An object of the present invention is to provide an improved high pressure mix-head with a movable slide plunger of constant diameter that, in conjunction with a mix-head body or sleeve, defines internal two-stream recirculation paths.

Another object of the present invention is to provide a key element on the end of the slide plunger configured to cooperate with a passage in the body so as to permit high pressure recirculation of all streams prior to mixing and injecting material into a mold thereby stabilizing temperature, pressures and flows before mixing is allowed to occur. On completion of injection the slide plunger returns displacing remaining mixed material from the mix head into the mold cavity.

Still another object of the present invention is to provide a mix-head as set forth in either of the preceding objects wherein the body or sleeve includes a pair of diametrically spaced longitudinal passages that are intersected by inlet and return ports which are selectively communicated in accordance with the axial position of the key element within the body or sleeve.

In a preferred embodiment the mix-head includes a slide plunger having a driven end connected to a drive piston in a drive cylinder. The drive cylinder has an extension connected to a mix-head body. The mix-head body has at least first and second inlets respectively connected to sources of first and second chemically reactive plastic compositions. The mix-head body further includes first and second return ports respectively connected to first and second reservoirs for each of the compositions. The slide plunger includes a key member on its outboard end that reciprocates in spaced recirculation passages in the mix-head. Further, the plunger has a constant diameter from the key member to the drive piston. The key member is positioned axially by the plunger in a first position to block communication between the aforesaid inlets and return ports during mixing of the two chemically reactive plastic compositions. The key member serves to displace the mixed materials from the mix chamber and the recirculation passages during a clean out step wherein communication is reestablished between the inlets and return ports of first and second recirculation loops.

Other objects and advantages and a more complete understanding of the invention will be apparent to those skilled in the art from the succeeding detailed description of the invention and the accompanying drawings thereof.

BRIEF DESCRIPTION OF THE DRAWINGS

FIG. 2 is a longitudinal cross-sectional view of the mix-head of FIG. 1 showing a recirculation mode;

FIG. 3 is a view like FIG. 2 showing a mixing mode;

FIG. 4 is a cross-sectional view taken along the line 4—4 of FIG. 3 looking in the direction of the arrows;

DESCRIPTION OF THE PREFERRED EMBODIMENT

Figure 1:
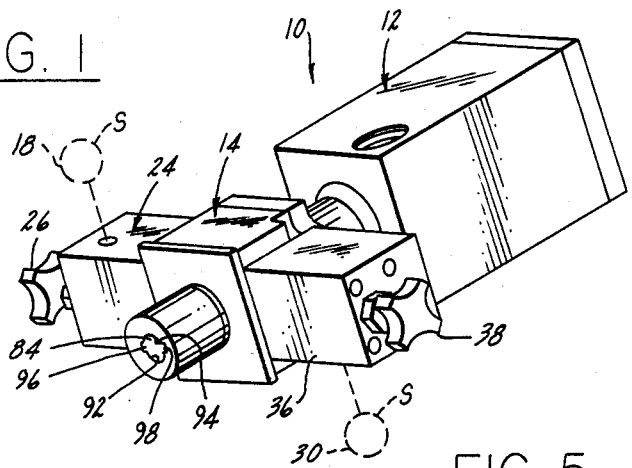
FIG. 1 is a perspective view of a two-stream mix-head including the present invention.

In FIGS. 1–4 a mix-head assembly 10 is illustrated for mixing and feeding two reactive chemical compositions. The assembly 10 is of modular construction including a hydraulic motor 12 and a mix-head body 14. The assembly 10 is supplied with first and second chemical compositions, for producing moldings by an isocyanate poly addition process. The first composition is stored in a reservoir 16. A pump 18 draws material from reservoir 16 to a first mix-head inlet 20 which has a metering orifice 22 therein. If desired (and as shown in FIG. 1), the fixed metering orifice 22 can be replaced by a variable flow needle valve assembly 24 as shown in the FIG. 1 embodiment. In such case, adjustment of handle 26 will vary the proportional flow of the first composition to the mix-head. The second composition is stored in a reservoir 28. A pump 30 draws material from reservoir 28 to a second mix-head inlet 32 which has a metering orifice 34 therein which can be replaced by a variable flow needle valve assembly 36 like assembly 24 and serving the same purpose upon adjustment of its handle 38.

The hydraulic motor 12 includes a cylinder 39 having a piston 40 reciprocated therein by hydraulic flow through a port 42 in an end closure 44 which carries an annular seal 45 which engages the body 12 to prevent leakage of drive fluid.

The piston 40 is connected to one end of a slide plunger 46 by suitable fastening means shown as a nut 48 and threaded end 50. The body 12 includes a flanged extension 52 connected to mix-head body 14. The flanged extension 52 has a longitudinally directed bore 54 formed therethrough for guiding the plunger 46. A plurality of annular seal elements 56, 58, 60 seated in extension 52 seal the bore 54 from an inboard cylinder chamber 62 which in turn is sealed from the outboard cylinder chamber 64 by a ring seal 66 on the O.D. of piston 40. A hydraulic port (not shown) communicates with chamber 62 to supply and exhaust drive fluid in a known manner.

The plunger 46 extends through a bore 68 in the mix-head body 14 which is coaxial of bore 54. Bore 68 is of circular cross section and its I.D. is configured to slidingly, sealingly engage the O.D. of the plunger. The O.D. and the circular cross section of the plunger 46 is constant from end to end so as to maximize the structural capacity for a given plunger diameter.

The plunger 46 has a key element 70 on its distal end 72. The key element 70 has a circular cross section and a pair of diametrically located ribs 74, 76 which are slidably received in spaced, longitudinally directed bypass channels 80, 82 in the body 14. The channels 80, 82 extend from the end discharge port 84 of the body 14 to return ports 86, 88 which are connected, respectively, to reservoirs 16, 28.

The channels 80, 82 cooperate with the O.D. of plunger 46 to define separate recirculation paths for each of the first and second compositions when the mix-head assembly is positioned in the recirculation mode of FIG. 2. In this mode the key element 70 is located at the mix-head discharge port 84 to seal a mold cavity in which previously mixed components have been fed from the discharge port 84. More particularly, in this position, the key element 70 has a perimeter seal 90 thereon located to seal the walls of channels 80, 82 and two opposed arcuate segments 92, 94 at the outlet end of bore 68 to seal the mold from the mix-head. Also, the channel 80 is opened between the inlet 20 and the return port 86 to define a path for recirculation of the first chemical composition following feed of the previously mixed compositions into the mold. Likewise, the channel 82 is opened between the inlet 32 and the return port 88 so that the second chemical composition can recirculate freely. Each of the recirculation paths are sealed from one another by a pair of longitudinal seal strips 96, 98 in the sides of the wall of bore 68.

Mixing is accomplished when the key element 70 is positioned inboard of the bore 68 as shown in FIG. 3. When the key element 70 shifts between the FIG. 2 position and FIG. 3 position, the ribs 74, 76 on the key element 70 displace the recirculating streams back to the reservoir while blocking return ports 86, 88. The orifices 22 and 34 are opened to that the two streams of chemicals will impact against one another to produce mixing within the bore 68 downstream of the retracted key element 70. The mix constituents are then discharged into the mold by flow pressure until a predetermined amount of material has been injected after which the motor drive is energized by selectively controlling fluid to cause the motor piston 40 to shift from the FIG. 3 position to the position of FIG. 2. The discharge stroke shifts the key element 70 in a direction to clear remaining mixture of chemicals from bore 68 and the bypass passages 80, 82 and direct it through outlet 84 into a reaction injection mold.

Figure 5:
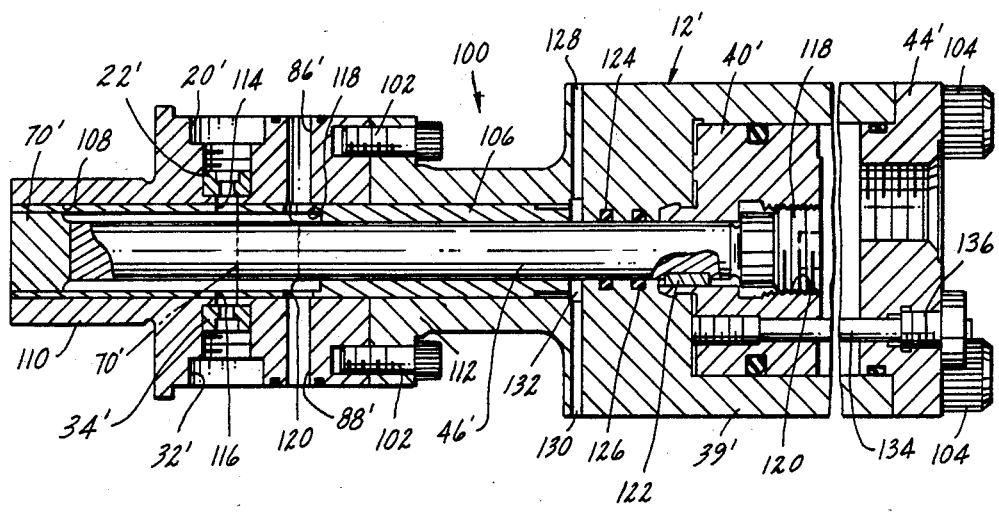
FIG. 5 is a longitudinal cross-sectional view of a second embodiment of the invention.
Figure 6:
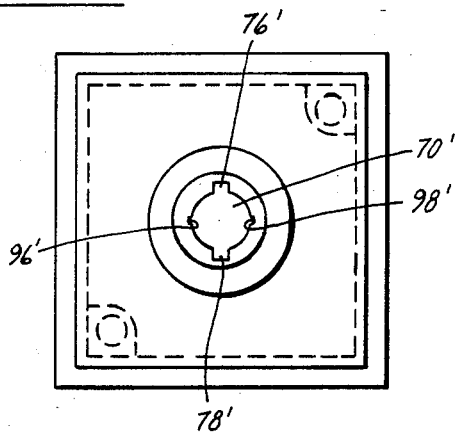
FIG. 6 is an end elevational view of the FIG. 5 embodiment at the outlet of the mix-head head.

In the embodiment of FIGS. 5 and 6, elements of the mix-head assembly 100 which are counterparts of elements of the mix-head assembly on FIGS. 2, 3 and 4 are designated with like reference numerals primed. In this embodiment, the key element 70' is positioned in a closed position shown in FIG. 5. It is driven by piston 40' of motor 12' to position the key element 70' in a mix mode, as shown in FIG. 3. The FIGS. 5 and 6 embodiment differs from the mix-head assembly 10 by showing connector screws 102, 104, respectively, for joining the motor 12' to mix-head body 14' and to join the end closure 44' to motor cylinder 39'. Also, it includes a wear-resistant sleeve 106 that is press fit in a bore 108 which extends through a mix-head body 110 and a flanged extension 112 on motor 12'. The sleeve 106 is formed of a material which resists wear from reinforcement fibers that may be included in one or more of the mixed streams. More particularly, sleeve 106 includes a pair of spaced ports 114, 116 that align with inlets 20', 32' that include metering orifices 22', 34', respectively. The sleeve 106 also includes openings 118, 120 in alignment with return ports 86', 88' in mix-head body 110. The key element ribs 76', 78' travel in passages 80', 82'.

The key element 70' assumes a retracted position when the two streams are injected into the mix-head for mixing.

In this embodiment, the piston 40' is secured to the plunger 46' by a socket head jam screw 118 threaded in an internally threaded end 120 of piston 40'. A key 122 is located between plunger 46' and piston 40' to prevent rotation therebetween. Seal rings 124, 126 are provided in motor cylinder 39' to seal plunger 46'. Additionally, vent ports 128, 130 and an annular relief opening 132 further separate the mixing system from the hydraulic motor 12'. A guide pin 134 is threadably connected at one end to piston 40'. The opposite end of pin 134 reciprocates through a packing gland 136 threaded in a tapped hole in the end closure 44'.

The operation of the embodiment in FIGS. 4 and 5 is identical to that of the first embodiment. The second embodiment however is more resistant to wear from reinforcement fibers in the compositions.

While two chemical streams are illustrated, the mix-head assemblies can be modified to include three or more sets of inlets and recirculation ports if more than two chemical compositions are to be mixed. For example, in case of three streams, the inlets and outlets can be disposed at points spaced one hundred and twenty degrees. A four-stream mix-head assembly will include inlets and recirculation ports at points spaced ninety degrees apart.

What is claimed is:

1. A mix-head assembly for combining two or more chemical streams for mixing and discharge into a mold cavity comprising: a mix-head body having means therein defining a longitudinal mixing bore with spaced, separate channels along the length thereof and a plurality of inlet openings, each of said inlet openings communicating with one of said channels to direct a chemical composition stream into said mixing bore, said mixing bore having an outlet end defining a discharge port for flow of a mixture of streams from said mixing bore to a mold cavity, means defining a return port in said body communicating with each of said channels, a slide plunger of constant diameter along its length in sliding fit relationship with the inside diameter of said bore, and a key element on the end of said slide plunger including a pair of ribs that reciprocate in said channels to selectively discharge residual material from the mix-head body through said discharge port and block flow through said discharge port to cause recirculation flow from each of said inlet openings through one of said channels to one of said return ports.

2. A mix-head assembly for combining two or more chemical streams for mixing and discharge into a mold cavity comprising: a mix-head body having a longitudinal mixing bore with spaced channels formed in said body along the length thereof, means sealing each of said channels from the other, means forming a plurality of inlet openings in said body, each of said inlet openings communicating with one of said channels to direct a chemical composition stream into said mixing bore, said mixing bore having an outlet end defining a discharge port for flow of a mixture of streams from said mixing bore to a mold cavity, means defining a return port in said body communicating with each of said channels, a slide plunger of constant diameter along its length in sliding fit relationship with said bore, and a key element on the end of said slide plunger including a pair of ribs that reciprocate in said channels to discharge residual material from the mix-head body through said discharge port, and actuating means for positioning said key element in a mixing position wherein all flow from said inlet openings mix in said bore for subsequent pressure injection into a mold after which any residual material is discharged by said slide plunger through said discharge port, said actuating means positioning said key element in a recirculation position wherein it blocks flow through said discharge port and opens communication between each of said inlet flow openings through one of said channels to one of said return ports.

3. A mix-head assembly for combining two or more chemical streams for mixing and discharge into a mold cavity comprising: a mix-head body having means including a wear resistant sleeve defining a longitudinal mixing bore with spaced separate channels along the length thereof, means sealing each of said channels from the other, means forming a plurality of inlet openings, each of said inlet openings communicating with one of said channels to direct a chemical composition stream into said mixing bore, said mixing bore having an outlet end defining a discharge port for flow of a mixture of streams from said bore to a mold cavity, means defining a return port in said body communicating with each of said channels, a slide plunger of constant diameter along its length in sliding fit relationship with the inside diameter of said bore, and a key element on the end of said slide plunger including a pair of ribs that reciprocate in said channels to selectively discharge residual material from the mix-head sleeve through said discharge port and block flow through said discharge port to cause recirculation flow from each of said inlet openings through one of said channels to one of said return ports.

4. A mix-head assembly for combining two or more chemical streams for mixing and discharge into a mold cavity comprising: a slide plunger, a mix-head body having a longitudinal mixing bore receiving said slide plunger, said mixing bore having a first inside diameter, means forming spaced opposed channels along the length of said bore, means forming a seal strip in said body engaging said plunger to separate each of said opposed channels from each other, a plurality of inlet openings in said body, each of said inlet openings communicating with one of said channels to direct a chemical composition stream into said mixing bore, said mixing bore having an outet end defining a discharge port for flow of a mixture of streams from said mixing bore to a mold cavity, means defining a return port in said body communicating with each of said channels, said slide plunger having a constant diameter along its length in sliding fit relationship with said bore, and a key element on the end of said plunger including a pair of ribs that reciprocate in said channels to discharge residual material from the mix-head body through said discharge port, and actuating means for positioning said key element in a mixing position wherein all flow from said inlet openings mix in said bore for subsequent discharge by pressure flow after which said slide plunger reciprocates discharging said residual material from said discharge port, said actuating means positioning said key element in a recirculation position wherein it blocks flow through said discharge port and opens communication between each of said inlet flow openings through one of said channels to one of said return ports.

5. In the combination of claim 4, an actuator piston and cylinder, a packing gland on said cylinder, a guide pin threadably connected at one end of said actuator piston free to reciprocate through said packing gland to provide visual or instrumented reference information regarding mix-head operating position.

* * * * *